Patented July 9, 1935

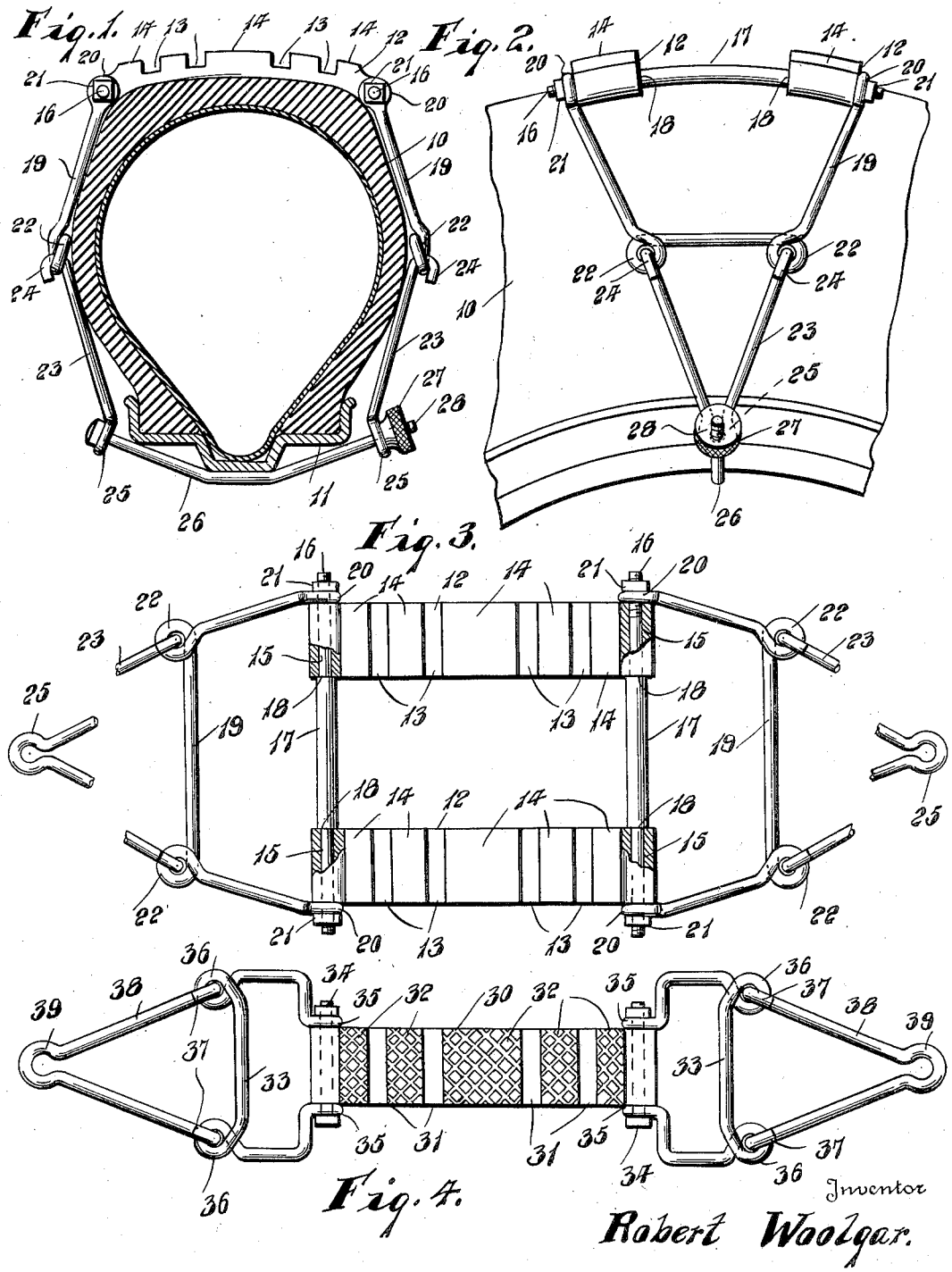

2,007,843

UNITED STATES PATENT OFFICE 2,007,843

TRACTION DEVICE FOR VEHICLE WHEELS

Robert Woolgar, Manhattan, Kans.

Application September 27, 1934, Serial No. 745,782

3 Claims. (Cl. 152—14)

The invention relates to traction devices particularly adapted for use with pneumatic tires as used on motor vehicle wheels and has for its principal object the provision of a traction increasing means that will not only increase the tractive force of the wheel in going forward or backward, but will also hold the wheel and prevent side slipping.

A further object of the invention is the provision of a traction device for the purpose stated that has no objectionable prongs to cut into the surface of roadways, such devices now being prohibited in a number of municipalities, and that depends upon flat metal protuberances, preferably rectangular in shape, and having abrupt edges that will engage ice on the roadway to increase traction of the wheels and also prevent side slipping.

A further object of the invention is the provision of a device of the character stated that may be readily mounted on the vehicle wheel and removed therefrom without necessitating jacking up the wheel in either operation.

The invention will be described in detail hereinafter and will be found illustrated in the accompanying drawing, in which Figure 1 is a transverse sectional view of a wheel rim and tire showing one of my improved traction devices mounted thereon, Figure 2 is a fragmentary side view in elevation of the part shown in Figure 1, Figure 3 is a plan view of one of the traction devices in extended position, and Figure 4 is a modified construction of the device.

In the drawing similar reference characters are used to designate corresponding parts in all of the views.

In Figures 1 and 2 a traction device is, as stated, shown in position on a tire and rim, the tire being designated 10, and the rim 11. As shown in Figures 1, 2, and 3, the traction device comprises a pair of substantially parallel plates 12 having transverse grooves 13 therein, forming therebetween substantially rectangular bearing members 14, the edges of said bearing members being abrupt, as shown, so that when in engagement with a slippery road, ice covered, or otherwise, the abrupt edges of the members 14 will prevent slipping in any direction, and in addition to increasing the traction of the wheel on which it is mounted either in going forward or backward, will prevent side skidding.

The opposite ends of the plates 12 are provided with transverse openings 15, and 16 indicates bars that are mounted in the openings 15 and having an enlarged intermediate section 17 providing shoulders 18 engaging the side edges of the plates 12 and serving to space said plates from one another as best shown in Figure 3. 19 designates U-shaped yokes having their ends provided with loops 20 to receive the extended ends of the bars 16, 21 indicating nuts mounted on the ends of said bars which may be threaded to receive the nuts, or any other suitable means for assembling the bars 16 with the loops may be substituted.

Yokes 19 are also provided with other spaced loops 22, and 23 designates V-shaped attaching members having terminal hooks 24 on the ends of their arms engaging in the loops 22, said attaching members 23 also having loops 25 at their apexes to receive a rod or bolt 26 to secure the device on the wheel as shown in Figures 1 and 2. 27 designates a nut mounted on the threaded end 28 of said rod or bolt to releasably hold the member in position on the wheel as stated.

In Figure 4 is shown a slightly modified construction in which there is provided a single plate 30 having a transverse groove 31 forming the bearing faces 32, that are rectangular, preferably, as hereinbefore described in relation to the other form. The faces of the members 32 are shown cross hatched by means of grooves arranged in substantially right angles to each other, and this face may be applied to the faces of the members 14 hereinbefore described, or the faces of the members 32 may be plain as are shown the faces 14.

Brackets 33 are pivotally mounted on the ends of the plate 30 by means of pins 34 engaging in loops 35, and have spaced loops 36 to receive the hooks 37 of a V-shaped mounting member 38, and said mounting members are provided with loops 39 for mounting the device on the tire in the same manner as that hereinbefore described in connection with Figures 1, 2, and 3.

What is claimed is:—

1. A traction device for vehicle wheels, comprising a tread member, yokes pivotally connected to opposite ends of said tread member, said yokes being each provided with spaced loops, V-shaped attaching members having terminal hooks engaging in said loops, the apex of each of said attaching members provided with a loop, and a bolt mounting the tread member on a vehicle wheel and tire and engaging in the loops in the attaching members.

2. A traction device for vehicle wheels, comprising tread plates, a spacing bar provided with reduced bearing terminals mounting said plates, yokes pivotally engaging the terminals of said bar, said yokes being each provided with spaced loops, V-shaped attaching members having terminal hooks engaging in said loops, said attaching members being each provided with a loop, and a bolt mounting said tread plates on a wheel and tire and engaging in the loops in the attaching members.

3. A traction device for vehicle tires, comprising a tread plate, yokes pivotally mounted on opposite ends of said plate, said yokes being each provided with spaced loops, V-shaped attaching members having terminal hooks to engage in said spaced loops, the apex of each of said attaching members provided with a loop, and means engaging in the loops in the attaching members to hold the plates on the tread of a wheel tire.

ROBERT WOOLGAR.